UNITED STATES PATENT OFFICE.

LEE H. P. MAYNARD, OF PHILADELPHIA, PENNSYLVANIA, ASSIGNOR OF ONE-HALF TO GEORGE P. SACKS, OF BRADLEY HILLS, MARYLAND.

PROCESS FOR THE PRODUCTION OF ICE CREAM.

1,415,669. Specification of Letters Patent. Patented May 9, 1922.

No Drawing. Application filed December 30, 1920, Serial No. 434,117. Renewed December 7, 1921. Serial No. 520,693.

*To all whom it may concern:*

Be it known that I, LEE H. P. MAYNARD, a citizen of the United States of America, residing at Philadelphia, in the county of Philadelphia and State of Pennsylvania, have invented certain new and useful Improvements in Processes for the Production of Ice Cream, of which the following is a specification.

This invention relates to a process for the production of ice cream, wherein the texture is given to the ice cream through the particular manner of treatment of the mix, rather than through the use of a particular ingredient or filler, such as gelatine starch, gums or the like, as now practiced in the present method of manufacturing ice cream.

In order to accomplish the desired result, my improved method involves several essential characteristic steps, each with a particular object in view and to produce at that time a condition tending toward a definite final result as a whole, such defined conditions being useful only in their relation to the whole result, though separately produced. The salient feature of the combined result enables me to produce a mix from which ice cream can be made without the employment of a separate ingredient or a filler to sustain the ice cream body when frozen.

For example, condensed milk is preferably used and treated to eliminate a quantity of the milk sugar in condensed milk, and to produce in the condensed milk a fermented state.

A high butter-fat material, as fresh cream, or cream made from butter, is mixed with the condensed milk, and to the cream is added a neutralizing agent and sugar to produce a product of a greater viscosity, the lime of which neutralizes a part of the acid already developed in the condensed milk when the two are mixed together.

The process is to be distinguished by the divisibility of the steps, each being peculiar to itself, but each having a defined result upon the whole. For instance, the first step ferments the condensed milk and changes a part of the milk sugar into a more soluble state, while the second step in the process creates a viscous condition to increase the texture for the body of the ice cream mix so it will whip more readily.

In carrying out the process, condensed milk is pasteurized at a temperature of about 165° F., to free it from pathogenic organisms, then cooled, and lactic acid bacteria are added while the milk is held at a temperature sufficient for producing the particular fermentation desired. If slow fermentation is contemplated, the temperature will be correspondingly low, say 32°; while for rapid action, the temperature will be much higher, say 90°, though these two temperatures define approximately the respective limits. During fermentation under these conditions, the fermenting agent changes a part of the milk sugar into lactic acid and the material is brought to or about the point of coagulation on heating. The mixture thus produced is allowed to stand until the predetermined acidity, say in excess of five tenths of one per cent, is reached. This condense is then repasteurized and cooled and then added to the prepared cream.

As the main second step of the process, fresh cream, or cream made from butter, with or without pasteurization, is homogenized, to break up the fat globules. To the homogenized cream is added sufficient alkali, as lime, to neutralize the excess acid developed in the condensed milk before referred to, when the two are mixed. In addition to the lime, a part of the necessary sugar to sweeten the mass is added to the cream, the sugar together with the alkali producing a more viscous product. By adding a part only of the necessary sugar at this time, the smoothness of the completed product is more certainly assured, as only that part of the sugar content is added which will be completely and easily dissolved, thus producing a condition where there will be less tendency for milk sugar crystals to form in the final product. The cream, lime, and sugar mixture forms an emulsion which "whips" easily, the necessary water being retained by the fats and lime, just enough lime being added to standardize the acid in the final product. This mixture of cream, lime and sugar is then pasteurized and cooled.

The two separately produced ingredients, that is, the fermented condensed milk and the cream, et cetera, are then mixed with immediate and constant agitation. The alkali of the cream mixture partially neutralizes the acid condition of the condensed milk mixture, and the agitation, preferably without heat produces that intimate mixture of the fats, alkali, casein, albuminoids, et cetera, necessary for a proper ice cream mix.

The condensed milk is ripened to a high degree of acidity and contains part of the enzymes of the normal milk, which with the acid condition creates a partial ripening action, not to the extent however, of coagulation. After the emulsification of the two mixtures, aging is resorted to, during which the enzymes, as pepsin, rennet, or the like, are added, to aid in the thickening power of the mixture and thereby partially coagulating the proteins and tending to congeal the ingredients that is, the mass is partially coagulated until a definite body is formed, and proper viscosity is attained. The remaining portion of the sugar content is added and then the desired flavor introduced, or the sugar and flavor may be added together. It is important that the final sugar be added in a very finely divided powdered form to bring the mass up to the desired sweetness. A part of the fine sugar is held in suspension in the mixture, and while adding its characteristic sweetness to the final product when eaten, it also adds to the "smoothness" of the product.

Cane sugar is slow to dissolve in the cold mixture and as the finely divided powder is mixed at or about the time of freezing the mix, the sugar is substantially maintained in fine crystal form in suspension in the final frozen product, the crystals being so fine as not to be objectionable when eating the ice cream.

It is to be noted that the cream mixture produces a mass which is somewhat in the nature of a gum or the like, which when mixed with the condensed milk and the enzymic process takes place acts as a substantial filler for the body of the ice cream, with the result that I dispense with the use of gelatine starch, gums, or the like, a factor which is of vital commercial importance in the manufacture of ice cream.

Another important step in the process resides in the fact that a part of the milk sugar by reason of the first treatment of the condensed milk, is made more soluble by the fermenting action, and the cane sugar or saccharose is added in such manner which so changes the condition of the final product that the milk sugar is prevented from ultimately recrystallizing in the ice cream thus preventing a condition known as sandy ice cream.

What I claim is:—

1. The herein described process of producing an ice cream mix, consisting in producing an acid milk mixture, an alkali cream emulsification, and mixing the milk mixture and the emulsion under agitation.

2. The herein described process of producing an ice cream mix, consisting in producing an acid fermentation in condensed milk, making a separate mixture of cream, alkali, and a portion of the necessary sugar to sweeten the mass, then uniting the milk mixture and the cream mixture under agitation.

3. The herein described process of producing an ice cream mix, consisting in producing an acid fermentation in condensed milk, making a separate mixture of cream, alkali, and a portion of the necessary sugar, then uniting the two under agitation, and aging the mixture with the addition of enzymes.

4. The herein described process of producing an ice cream mix, consisting in first preparing a mixture of an acid fermentation in condensed milk, then preparing an emulsion of cream with an alkali and sugar, mixing the two under agitation, completing the emulsification with heat, and aging the mixture while increasing its viscosity.

5. The process of making ice cream consisting in converting part of the milk sugar in condensed milk into acid to or about a state of coagulation then treating, separately mixing with cream an alkali and only such an amount of sugar as will readily dissolve and thereby form an emulsion, then mixing the fermented condensed milk and the emulsion together and agitating the mixture, thereafter adding enzymes to the mixture, adding the necessary powdered sugar to sweeten the mixture, and promptly freezing the mix while a part of the powdered sugar is held in suspension.

6. The herein described process of producing an ice cream mix, consisting in producing an acid milk mixture, separately mixing cream and a neutralizing agent together with a part of the desired sweetening medium and emulsifying the same, and subsequently mixing the acid milk mixture and the neutralized cream emulsion under agitation, the viscous cream product serving in the place of a filler to make the ice cream mix whip more readily when being frozen.

7. The herein described method of making an ice cream mix consisting in adding acid forming ferments to condensed milk to ferment the latter, separately mixing cream, an alkali, and sugar to give a sustaining consistency to the body when subsequently frozen as ice cream, and thereafter mixing the condensed fermented milk and the treated cream together.

8. The herein described method of making an ice cream mix consisting in fermenting condensed milk, separately mixing and treating cream, and pasteurizing same, adding an agent to make it viscous to increase the texture, then mixing the fermented condensed milk and the cream to form an emulsion, and thereafter freezing the mass.

9. The herein described method of making ice cream consisting of fermenting condensed milk, then pasteurizing and cooling same, separately mixing and treating cream with sugar and an alkali, pasteurizing and cooling same, then mixing the fermented condensed milk and the treated cream to form an emulsion, then adding enzymes to develop a heavier body to the mix, thereafter adding the balance of the sugar necessary to sweeten the mix and adding all the desired flavor to the mix, and finally freezing the mass.

In testimony whereof I affix my signature.

LEE H. P. MAYNARD.